(12) United States Patent
Hodge

(10) Patent No.: US 9,806,754 B1
(45) Date of Patent: Oct. 31, 2017

(54) UNIVERSAL CELL PHONE HAND HOLDING AND SAFETY DEVICE CASE

(71) Applicant: Todd Hodge, Cocoa, FL (US)

(72) Inventor: Todd Hodge, Cocoa, FL (US)

(*) Notice: Subject to any disclaimer, the term of this patent is extended or adjusted under 35 U.S.C. 154(b) by 0 days.

(21) Appl. No.: 15/348,609

(22) Filed: Nov. 10, 2016

Related U.S. Application Data

(60) Provisional application No. 62/254,966, filed on Nov. 13, 2015.

(51) Int. Cl.
| | |
|---|---|
| *H04M 1/00* | (2006.01) |
| *H04B 1/3827* | (2015.01) |
| *H04B 1/3888* | (2015.01) |
| *H04M 1/02* | (2006.01) |

(52) U.S. Cl.
CPC ............ *H04B 1/385* (2013.01); *H04B 1/3888* (2013.01); *H04M 1/0202* (2013.01); *H04B 2001/3855* (2013.01); *H04B 2001/3861* (2013.01)

(58) Field of Classification Search
CPC ............................ H04B 1/3888; G06F 1/1656
USPC .......... 455/575.1, 575.8; 361/679.09, 679.26
See application file for complete search history.

(56) References Cited

U.S. PATENT DOCUMENTS

| | | | | |
|---|---|---|---|---|
| 5,388,691 A | * | 2/1995 | White | A45C 11/00 206/305 |
| 5,887,777 A | | 3/1999 | Myles | |
| 5,938,137 A | * | 8/1999 | Poulson | A45F 5/004 242/379.2 |
| 6,646,864 B2 | | 11/2003 | Richardson | |
| D533,994 S | | 12/2006 | Hussaini | |
| 8,775,710 B1 | * | 7/2014 | Miller | G06F 1/1626 361/679.17 |
| 8,950,582 B2 | * | 2/2015 | Chang | B65D 81/022 206/521 |
| 9,112,585 B2 | | 8/2015 | Schiffman | |
| 9,254,023 B2 | | 2/2016 | Su | |
| 9,306,612 B2 | | 4/2016 | Forsythe | |
| 2012/0111909 A1 | | 5/2012 | Pappas | |
| 2015/0102073 A1 | | 4/2015 | Pusateri | |
| 2016/0058145 A1 | | 3/2016 | Whitten | |
| 2016/0262513 A1 | | 9/2016 | O'Neill | |

* cited by examiner

*Primary Examiner* — Ping Hsieh
(74) *Attorney, Agent, or Firm* — Brian S. Steinberger; Law Offices of Brian S. Steinberger, P.A.

(57) ABSTRACT

Cases, devices, and methods for protecting and holding portable handheld devices, such as cell phones and smart phones, in separate protective cases having outwardly extending resilient bumper corner eye lit rings which cushion the case and function as bumpers when the portable electronics device are dropped. The outwardly extending bumpers/eye lit rings can also support lanyards and keychain rings, and the like, so that the cases with portable electronics devices can be easily and safely held in one's finger, about their wrist, or on their neck. A central ring can be formed from an upper middle portion of the case for allowing the forefinger of a user to be inserted therein with the back of the hand supporting the case, and the lanyard wrapped about the user's wrist. The novel cases can also be used to safely protect other types of portable electronic devices, such as tablets and laptop computers, and the like, in similar manners. Portable electronic device housings can be initially manufactured and built with the outwardly extending resilient rings offering safe protection from being dropped and for being held, carried or worn.

20 Claims, 7 Drawing Sheets

FIG. 1
FIG. 2
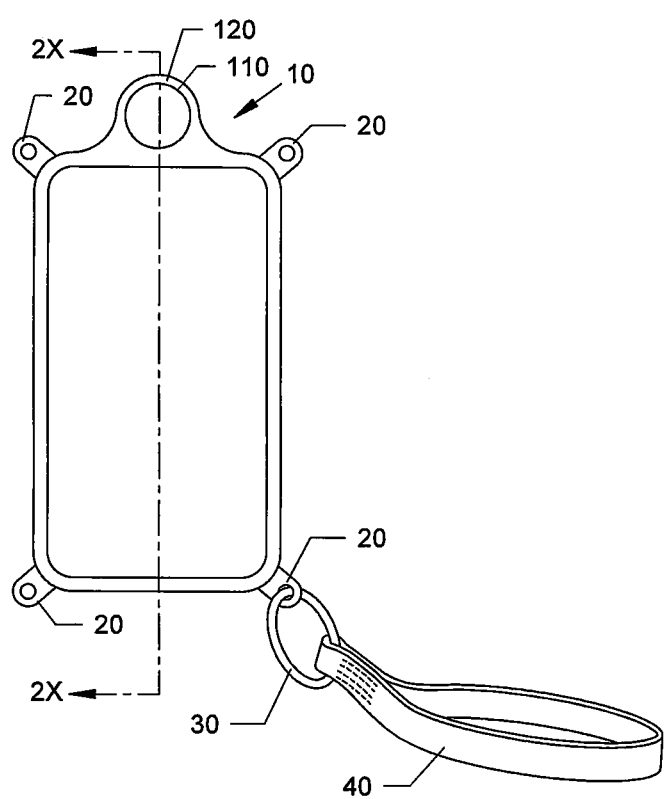
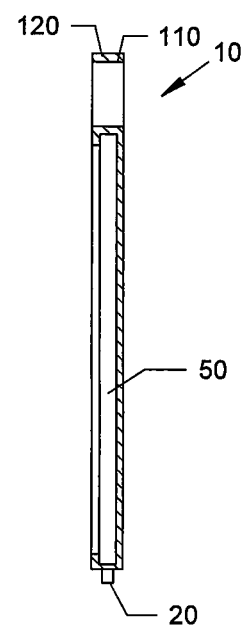

FIG. 3
FIG. 4
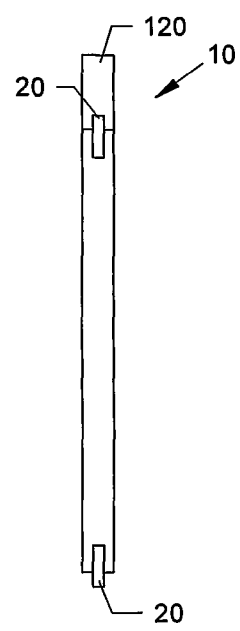
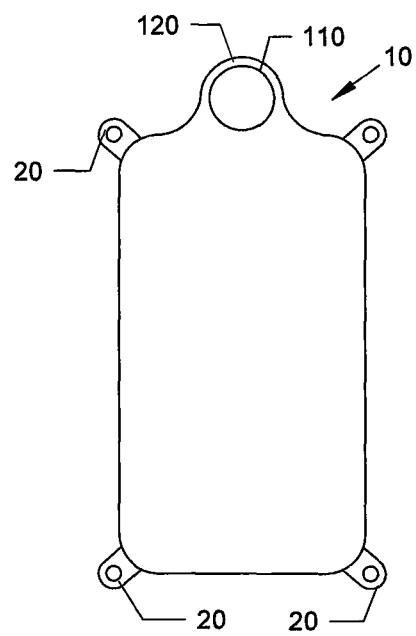

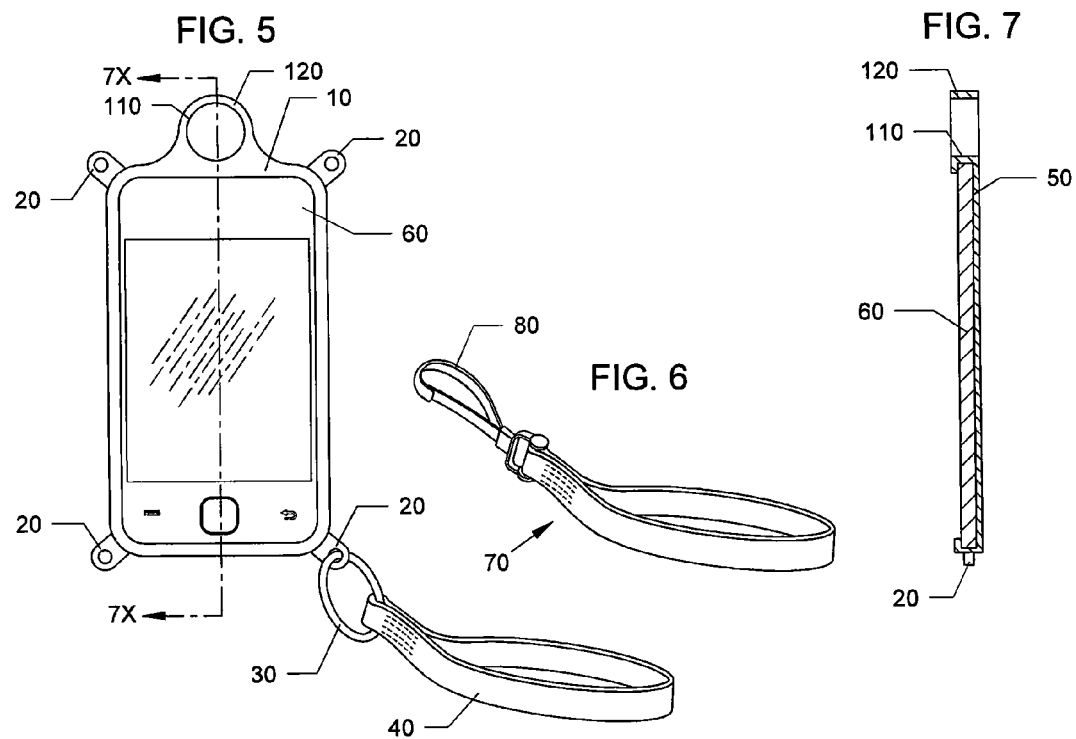

FIG. 13
FIG. 14
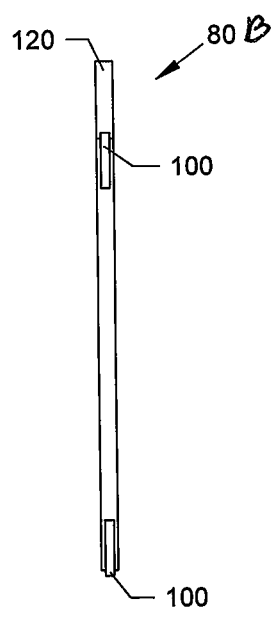
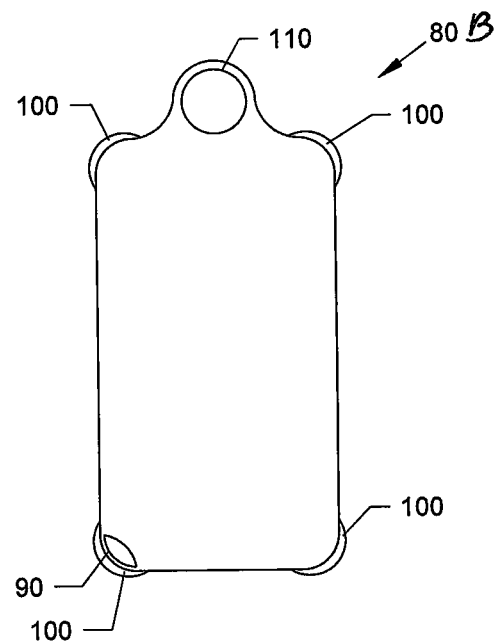

UNIVERSAL CELL PHONE HAND HOLDING AND SAFETY DEVICE CASE

This application claims the benefit of priority to U.S. Provisional Patent Application Ser. 62/254,966 filed Nov. 13, 2015, which is incorporated by reference in its' entirety.

FIELD OF INVENTION

This invention relates to cases for portable handheld devices, and in particular to cases, devices, and methods for protecting and holding portable handheld devices, such as cell phones, smart phones, tablets and laptop computers, in separate protective cases or in housings for the portable electronics devices having outwardly extending resilient corner eye lit rings or corner bumpers, which cushion the portable electronics device to prevent damage when dropped, and for using the eye lit rings to support lanyards and keychain rings, and the like, so that the portable electronics devices can be easily and safely held in one's hand and fingers with the lanyard about their wrist or on their neck.

BACKGROUND AND PRIOR ART

Smart phones such as the APPLE® iPHONE® and SAMSUNG® ANDROID® and other types of similar devices are extremely popular and can be generally expensive investments. These types of portable handheld devices can cost hundreds of dollars and more. These expensive handheld devices cause their owners to purchase allegedly protective cases, and the like, to protect the devices from being dropped and damaged.

However, the cases on the market are generally only rectangular boxes shaped in configuration usually with corners, and still do not fully protect the portable electronic device when it is dropped. Often the case with the portable electronic device will fall on a corner edge, which still can cause damage to the phone, where cracks in the glass cover can occur, or worse yet the phone becomes inoperable. Additionally the dropped portable electronic device in its' case can fall on a side edge, and also cause damage to the portable electronic device.

Additionally, traditional cases are difficult to hold since the user must keep the entire rectangular case in the palm of their hand where most if not all of their fingers are needed to grip the portable electronics device. Here, the user can easily drop the portable electronics device if they remove one or more fingers.

Other types of portable electronic devices, such as but not limited to tablets, and laptops also have similar problems where the cases do not adequately protect the stored electronic devices when they are dropped.

Still furthermore, small portable electronics device can easily be forgotten and lost, which is also undesirable.

Thus, the need exists for solutions to the above problems with the prior art.

SUMMARY OF THE INVENTION

A primary objective of the present invention is to provide cases, devices, and methods for protecting and holding portable electronic handheld devices, such as cell phones, smart phones, tablets and computers in separate protective cases having resilient outwardly extending bumpers and/or corner eye lit rings and upper center protruding rings, which protect the portable electronic devices when they are dropped.

A secondary objective of the present invention is to provide cases, devices, and methods for protecting and holding portable electronic handheld devices, such as cell phones, smart phones, tablets and computers in separate protective cases having resilient outwardly extending bumper corner eye lit rings and upper center protruding rings, which can attach to key chains, and the like, which the user can easily and safely hold their portable electronics device by inserting finger(s) into the keychain rings, which safely allows the user to hold the cases and phones without the necessity for requiring the user to use their palm and all their fingers to safely hold the case.

A third objective of the present invention is to provide cases, devices, and methods for protecting and holding portable electronic handheld devices, such as cell phones, smart phones, tablets and computers in separate protective cases having resilient outwardly extending bumper corner eye lit rings and upper center protruding rings that allow lanyards and the like, to be hooked therein, so that one could hold the phone by the lanyard or wrap the lanyard around their wrist or on their neck.

A fourth objective of the present invention is to provide cases, devices, and methods for protecting and holding portable electronic handheld devices, such as cell phones, smart phones, tablets and laptop computers with resilient outwardly extending bumper corner eye lit rings and center outward protruding rings which protect the portable electronic devices when they are dropped.

A fifth objective of the present invention is to provide cases, devices, and methods for protecting and holding portable electronic handheld devices, such as cell phones, smart phones, tablets and laptop computers with resilient outwardly extending bumper corner eye lit rings and upper center protruding rings which can attach to key chains, and the like, and upper center extending rings, which the user can easily and safely hold their portable electronics device by inserting finger(s) into the keychain rings, which safely allows the user to hold the cases and phones without the necessity for requiring the user to use their palm and all their fingers to safely hold the case.

A sixth objective of the present invention is to provide cases, devices, and methods for protecting and holding portable electronic handheld devices, such as cell phones, smart phones, tablets and laptop computers with resilient outwardly extending bumper corner eye lit rings and upper center protruding rings that allow lanyards and the like, to be hooked therein, so that one could hold the phone by the lanyard or wrap the lanyard around their wrist or neck.

A case for safely holding and supporting portable electronic devices, that can include a back panel adapted for substantially covering a back of a portable electronics device, an upper wall substantially perpendicular to a top edge of back panel adapted for substantially covering a top of the portable electronics device, left and right side walls substantially perpendicular to left and right side edges of the back panel adapted for substantially covering left and right sides of the portable electronics device, a bottom wall substantially perpendicular to a bottom edge of the back panel adapted for substantially covering a bottom of the portable electronics device, wherein the back panel, the left and the right side walls, and the bottom wall form the case for the portable electronics device, with the case having an upper left corner and an upper right corner and a lower left corner and a lower right corner, an upper left corner bumper ring extending from the upper left corner of the case, an upper right corner bumper ring extending out from the upper right corner of the case, a lower left corner bumper ring extending from the lower left corner of the case, a lower right corner bumper ring extending from the lower right corner of the case, and an upper center extending ring extending from the case between the upper left corner and the upper right corner The upper left corner ring, the upper right corner ring, the lower left corner ring, the lower right corner ring and the upper center extending ring can be molded from a resilient material selected from at least one of rubber, elastomer and plastic material.

The case can further include at least one key ring for being attachable and detachable from at least one of the corner bumper rings on the case.

The case can further include a lanyard for being attachable and detachable from at least one of the bumper corner rings on the case.

The portable electronics device can be a cell phone, a smart phone where the case can be held and supported in a single hand. Alternatively, the case can be made large enough to support a tablet or a laptop computer.

A case for protecting portable electronics devices, can include a housing adapted for protecting a portable electronics device, the housing having four outwardly protruding bumper corners; at least one ring extending from at least one of the four outwardly protruding bumper corners, and a central ring extending upward from a top of the housing, wherein the bumper corners and the upward extending central ring protects the portable electronics device when the case with the portable electronics device is dropped.

The case can further include at least one key ring for being attachable and detachable from at least one of the corner rings on the case, and a lanyard for being attachable and detachable from at least one of the corner rings.

A method of protecting a portable electronics device from being dropped or lost, can include the steps of providing a case for a portable electronics device having a back wall, sides, an upper left bumper corner, an upper right bumper corner, a lower left bumper corner, a lower right bumper corner and a center ring extending up from the case between the upper left bumper corner and the upper right bumper corner, providing a lanyard strap with a key ring, attaching the key ring to one of the upper left corner bumper, the upper right corner bumper, the lower left bumper corner and the lower right bumper corner, and safely supporting the case with the portable electronics device adapted for support in one hand wherein a forefinger can pass through the center ring extending up from the case with the case resting against a user's palm, and the lanyard strap adapted to be wrapped about the one hand of a user, so as to prevent the case with the portable electronics device from being dropped, and becoming lost.

The step of providing the case can include the step of providing ring openings in each of the upper left corner bumper, the upper right corner bumper, the lower left bumper corner and the lower right bumper corner, so that the key ring can be attached to any corner bumper.

The case and each of the upper left corner bumper, the upper right corner bumper, the lower left bumper corner and the lower right bumper corner; and the center ring can be formed form one mold.

Further objects and advantages of this invention will be apparent from the following detailed description of the presently preferred embodiments which are illustrated schematically in the accompanying drawings.

BRIEF DESCRIPTION OF THE FIGURES

FIG. 1 is a front view of the novel case with no portable electronics device with corner tabs, upper central hole, and lanyard attached.

FIG. 2 is a cross-sectional view of the case of FIG. 1 along arrows 2X

FIG. 3 is a left side or right side view of the case of FIG. 1 with no lanyard.

FIG. 4 is a rear view of the case of FIG. 1 with no lanyard.

FIG. 5 is a front view of the case in FIG. 1 with portable electronics device and lanyard attached.

FIG. 6 is a front view of an alternative lanyard with snap clip ring.

FIG. 7. is a cross-sectional view of the case of FIG. 5 along arrows 7X without the lanyard.

FIG. 13 is a right or left side view of the portable electronics device of FIG. 12.

FIG. 14 is a rear view of the portable electronics device of FIG. 12.

DESCRIPTION OF THE PREFERRED EMBODIMENTS

Figure 8:
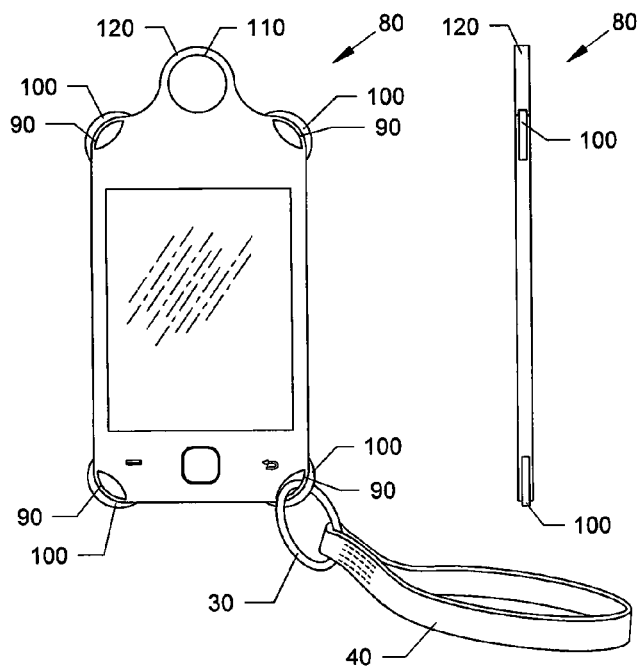
FIG. 8 is a front view of a portable electronics device having built-on corner rings, and upper central hole.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
10 Cell phone case with lanyard/safety lugs molded in.
20 Lanyard/safety lug corners.
30 Lanyard attachment ring.
40 Lanyard strap.
50 Cell phone cavity in case.
60 Cell phone.
70 Lanyard with alternate snap clip attachment.
80 Cell phone modified to incorporate lanyard attachment feature and molded on 4 corner safety bumpers with 4 corner holes.
80B Cell phone modified with 4 corner safety bumpers and one corner hole.
90 Lanyard attachment corner holes.
100 Molded on safety bumpers.
110 Upper center hole
120 protruding upper center ring
130 hand holding rear of handheld case 10 with forefinger through upper center hole 110 in ring 120 and lanyard 40 wrapped about wrist.
130B hand holding rear of handheld case 80B with forefinger through upper center hole 110 in ring 120 and lanyard 40 wrapped about wrist.

First Embodiment—Separate Protective Case with Outward Extending Corner Eyelit Rings FIG. 1 is a front view of the novel one piece case 10 with no portable electronics device with molded 4 corner tabs 20, upper central hole 110 in upper molded protruding center ring 120, and lanyard 40 attached by an attachment ring 30 to one of the corners 20. FIG. 2 is a cross-sectional view of the case 10 of FIG. 1 along arrows 2X FIG. 3 is a left side or right side view of the case 10 of FIG. 1 with no lanyard 40. FIG. 4 is a rear view of the case of FIG. 1 with no lanyard 40.

FIG. 5 is a front view of the case 10 in FIG. 1 with portable electronics device, such as but not limited to a smart phone mounted in the case 10 and lanyard 40 attached.

FIG. 6 is a front view of an alternative lanyard 70 with snap clip ring 80 that can also be attached to one of the molded on corner tabs 20.

FIG. 7. is a cross-sectional view of the case 10 of FIG. 5 along arrows 7X without the lanyard 40, 70.

The outwardly extending eye lit rings 20 with the lanyards 40 and/or attached attachment rings 30, or clip on rings 80 or other types of keychain rings, and the like, allow for the portable electronics devices to be easily and safely held in one's finger, about their wrist, or on their neck.

The corner tabs 20, and the center ring 120 can help cushion the case when it is dropped onto a floor, table, and the like, and help prevent damage to the portable electronics device that is mounted in the case 10.

The case 10 with protruding tabs 20 can also be referred to as outwardly extending corner eye lit rings 20 that can be formed from and molded from resilient material such as rubber, elastomer, plastic, combinations thereof, and the like. Additionally, the material can include hardened plastic, and the like, and/or combinations of rubber and plastic type material and the like.

The portable electronics device can include a cell phone or smart phone. A lanyard strap 40 can be attached to anyone of the eye lit rings 20 by a lanyard attachment ring 30.

Figure 11:
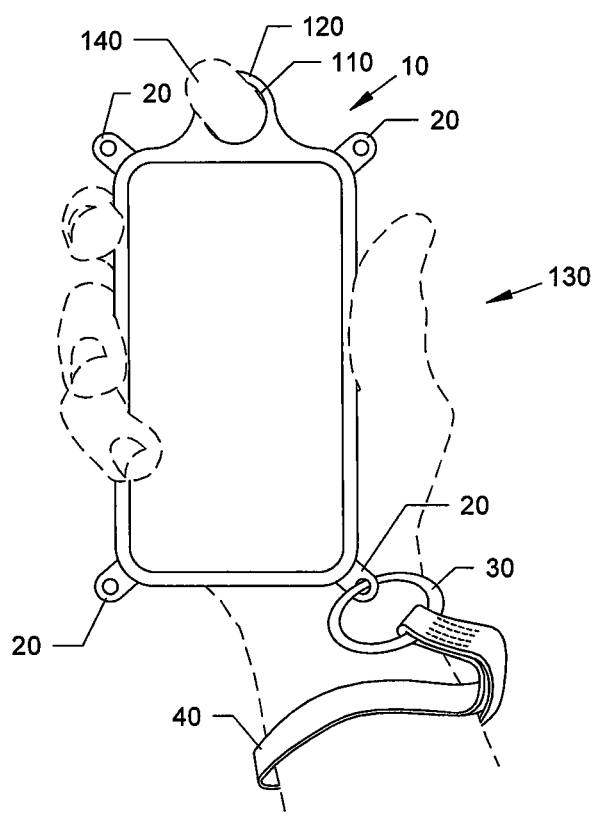
FIG. 11 is another view of the case of FIG. 1 being held in one's hand.

FIG. 11 is another view of the case 10 of FIG. 1 being held in a palm of one's hand where the rear of the case 10 faces the palm of the hand. The user's forefinger can be inserted through the hole 110 of the upper ring 120, and the lanyard strap 40 can be wrapped about the user's wrist, which helps prevent the portable electronics device from being dropped or lost or misplaced.

Second Embodiment—Device Housing with Corner Extending Rounded Bumper Rings

Figure 9:
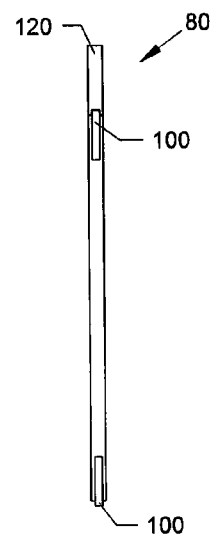
FIG. 9 is a left side or right side view of the portable electronics device of FIG. 8.
Figure 10:
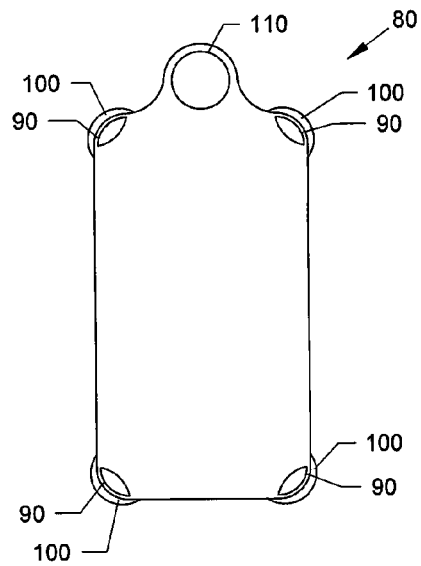
FIG. 10 is a rear view of the portable electronics device of FIG. 8.

FIG. 8 is a front view of a portable electronics device 80 having built-on molded bumper/corner rings 100 with corner holes 100, and an upper central hole 110 in a rounded molded ring 120. FIG. 9 is a left side or right side view of the portable electronics device 80 of FIG. 8. FIG. 10 is a rear view of the portable electronics device 80 of FIG. 8.

Similarly, a lanyard strap 40 can be attached to one of the holes 90 in the corner molded bumpers 100 with a lanyard attachment ring 30.

Similar to the previous embodiment, the corner bumpers 100 and the center ring 120 can help cushion the portable electronic device when it is dropped onto a floor, table, and the like, and help prevent damage to the portable electronics device that is mounted in the case 10. The portable electronics devices can be cell phones or smart phones. When the portable electronics devices are built at the factory, the housings can include corners having eyelet 90 and outwardly extending ring portions 100 that can function as bumpers for protecting the portable electronics devices when they are dropped.

The bumper corners 100 and rest of the built on housing can be formed from resilient materials, such as but not limited to rubber, hardened plastic, combinations thereof, and the like.

The outwardly extending corner bumpers 100 with the lanyards 40 and/or attached attachment rings 30, or clip on rings 80 or other types of keychain rings, and the like, allow for the portable electronics devices to be easily and safely held in one's finger, about their wrist, or on their neck.

Figure 12:
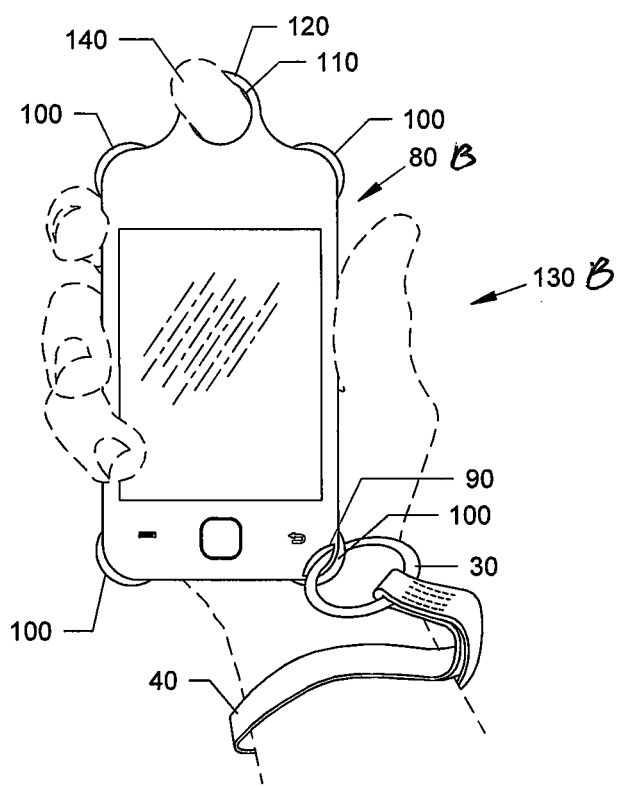
FIG. 12 is a front view of another portable electronics device having built-on corners and upper central hole being held in one's hand.

Third Embodiment Case with Corner Bumpers and One Corner Hole and Upper Protruding Center Ring FIG. 12 is a front view of another portable electronics device 80B (with built on case) having built-on bumper corners 100 and upper central hole 110 in upper center ring 120 being held in one's hand. The palm of the hand 130B can support the rear of the case with the forefinger protruding through the upper central hole 110 in upper middle ring 120, and lanyard strap 40 wrapped about the user's wrist which helps prevent the portable electronics device from being dropped or lost or misplaced.

FIG. 13 is a right or left side view of the portable electronics device 80B of FIG. 12. FIG. 14 is a rear view of the portable electronics device 80B of FIG. 12.

Although the portable electronics device are referenced as cell phones or smart phones, the novel invention can be used with other portable electronic devices, such as but not limited to tablets and laptop computers, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A case for safely holding and supporting portable electronic devices, comprising:
    a back panel adapted for substantially covering a back of a portable electronics device;
    an upper wall substantially perpendicular to a top edge of back panel adapted for substantially covering a top of the portable electronics device;
    left and right side walls substantially perpendicular to left and right side edges of the back panel adapted for substantially covering left and right sides of the portable electronics device;
    a bottom wall substantially perpendicular to a bottom edge of the back panel adapted for substantially covering a bottom of the portable electronics device, wherein the back panel, the left and the right side walls, and the bottom wall form the case for the portable electronics device, with the case having an upper left corner and an upper right corner and a lower left corner and a lower right corner;
    an upper left corner bumper ring extending from the upper left corner of the case;
    an upper right corner bumper ring extending out from the upper right corner of the case;
    a lower left corner bumper ring extending from the lower left corner of the case;
    a lower right corner bumper ring extending from the lower right corner of the case; and
    an upper center extending ring having a circular opening directly molded to and extending upward from the case between the upper left corner and the upper right corner, the upper center extending ring having a planar surface across a front face of the upper center extending ring being parallel to the back panel of the case, wherein the upper left corner ring, the upper right corner ring, the lower left corner ring, the lower right corner ring and the upper center extending ring are molded from a resilient material.

2. The case of claim 1, wherein the resilient material is selected from rubber, elastomer and plastic material.

3. The case of claim 2, wherein the back panel, the top wall, the left and the right walls, and the bottom walls are molded from the resilient material.

4. The case of claim 1, wherein the case is formed from a single mold.

5. The case of claim 1, further comprising:
    at least one key ring for being attachable and detachable from at least one of the corner bumper rings on the case.

6. The case of claim 5, further comprising:
    a lanyard for being attachable and detachable from at least one of the bumper corner rings on the case.

7. The case of claim 1, wherein the portable electronics device is a cell phone.

8. The case of claim 1, wherein the portable electronics device is a smart phone.

9. The case of claim 1, wherein the portable electronics device is a tablet.

10. The case of claim 1, wherein the portable electronics device is a laptop computer.

11. The case of claim 1, wherein the upper center extending ring includes:
    concave curved sides on outer side perimeters of the center ring where the center ring meets the top edge of back panel; and
    a convex curved side perimeter on a top of the center ring.

12. A case for protecting portable electronics devices, comprising:
    a housing adapted for protecting a portable electronics device, the housing having a back panel and four outwardly protruding bumper corners;
    at least one ring extending from at least one of the four outwardly protruding bumper corners; and
    a central ring extending having a circular opening directly molded to and extending upward from a top of the housing, the central ring having a planar surface across a front face of the central ring being parallel to the back panel of the case, the housing the four outwardly protruding bumper corners and the central ring being molded from a resilient material, wherein the bumper corners and the upward extending central ring protects the portable electronics device when the case with the portable electronics device is dropped.

13. The case of claim 12, further comprising:
    at least one key ring for being attachable and detachable from at least one of the corner rings on the case.

14. The case of claim 13, further comprising:
    a lanyard for being attachable and detachable from the at least one key ring.

15. The case of claim 12, wherein the central ring includes:
    concave curved sides on outer side perimeters of the central ring where the central ring meets the top of the housing; and
    a convex curved side perimeter on a top of the central ring.

16. A method of protecting a portable electronics device from being dropped or lost, comprising the steps of:
    providing a case for a portable electronics device having a back wall, sides, an upper left bumper corner, an upper right bumper corner, a lower left bumper corner, a lower right bumper corner and a center ring having a circular opening directly molded to and extending upward from the case between the upper left bumper corner and the upper right bumper corner, the center ring having a planar surface across a front face being parallel to the back wall of the case, the case being molded from a resilient material;
    providing a lanyard strap with a key ring;
    attaching the key ring to one of the upper left corner bumper, the upper right corner bumper, the lower left bumper corner and the lower right bumper corner; and
    safely supporting the case with the portable electronics device adapted for support in one hand wherein a forefinger can pass through the center ring extending up from the case with the case resting against a user's palm, and the lanyard strap adapted to be wrapped about the one hand of a user, so as to prevent the case with the portable electronics device from being dropped, and becoming lost.

17. The method of claim 16, wherein the step of providing the case includes the step of:
    providing ring openings in each of the upper left corner bumper, the upper right corner bumper, the lower left bumper corner and the lower right bumper corner, so that the key ring can be attached to any corner bumper.

18. The method of claim 17, further comprising the steps of:
    providing a key ring to be attached to one of the ring openings in each of the upper left corner bumper, the upper right corner bumper, the lower left bumper corner and the lower right bumper corner;

providing a lanyard to be attached to the key ring, wherein the lanyard is adapted to be wrapped about a wrist of a single hand with a forefinger of the hand adapted to pass through a rear opening of the circular opening of the central ring, so that the single hand is adapted to hold and carry the case supporting the single electronics device.

19. The method of claim 16, wherein the case and each of the upper left corner bumper, the upper right corner bumper, the lower left bumper corner and the lower right bumper corner; and the center ring are formed form one mold.

20. The method of claim 16, further comprising the step of:

providing concave curved sides on outer side perimeters of the center ring where the center ring meets a top wall of the case; and providing a convex curved side perimeter on a top of the center ring.

\* \* \* \* \*